United States Patent [19]

Dhanji

[11] Patent Number: 4,555,457
[45] Date of Patent: Nov. 26, 1985

[54] BATTERY CELL CONTAINING POTASSIUM MONOPEROXYSULFATE IN THE CATHODE MIX

[75] Inventor: Shiraz A. Dhanji, Sunrise, Fla.

[73] Assignee: ACR Electronics Inc., Hollywood, Fla.

[21] Appl. No.: 536,634

[22] Filed: Sep. 28, 1983

[51] Int. Cl.⁴ .............................................. H01M 6/06
[52] U.S. Cl. .................... 429/199; 429/202; 429/224; 429/232; 29/623.1
[58] Field of Search ............... 429/224, 206, 207, 199, 429/218, 188, 202, 203, 232; 29/623.1

[56] References Cited

U.S. PATENT DOCUMENTS

| | | | |
|---|---|---|---|
| 2,715,653 | 8/1955 | Reid | 429/199 |
| 2,952,727 | 9/1960 | Kirk et al. | 429/224 X |
| 3,272,655 | 9/1966 | Balaguer | 429/165 |
| 3,433,679 | 3/1969 | Johnson et al. | 429/207 |
| 3,761,317 | 9/1973 | Sena, Jr. | 429/224 X |
| 3,902,921 | 9/1975 | Augustynski et al. | 429/224 X |
| 3,928,076 | 12/1975 | Moser et al. | 429/224 X |
| 4,336,315 | 6/1982 | Eda et al. | 429/224 X |
| 4,370,395 | 1/1983 | Nagaura et al. | 429/224 X |
| 4,450,214 | 5/1984 | Davis | 429/199 X |

FOREIGN PATENT DOCUMENTS 2076819  10/1971  France .................. 429/224

*Primary Examiner*—Anthony Skapars
*Attorney, Agent, or Firm*—Darby & Darby

[57] ABSTRACT

A battery cell which comprises an anode element of magnesium alloy metal, a carbon or stainless steel current collector, and a manganese-dioxide-type cathode mix and electrolyte comprising mainly manganese dioxide with the addition of potassium monoperoxysulfate to substantially improve the open-circuit voltage of the battery cell and to substantially decrease polarization. Additions to said mix of such metal oxides as nickel oxide, lead dioxide, cobalt oxide, aluminum oxide, copper oxide, silver oxide or others substantially contribute to increased battery capacity. The addition of lithium chloride to the above improved battery cell in small amounts substantially increases the low-temperature range of these battery cells without improvement of battery capacity.

18 Claims, 11 Drawing Figures

BATTERY CELL CONTAINING POTASSIUM MONOPEROXYSULFATE IN THE CATHODE MIX

BACKGROUND OF THE INVENTION

Battery cells for conventional batteries whether having an inside-outside construction, or a prismatic construction or bipolar packs or button cells, in single cells or multiple stack configurations, have by their design been limited in (1) useful life, (2) open circuit voltage, (3) battery capacity (4) start-up time and (5) low temperature applications. Primary cells of any of these constructions are composed of two electrodes (an anode and a cathode) with an electrolyte between the electrodes. The electrolyte is generally formed of a liquid or liquids to which a number of powdered or soluble ingredients (called the "cathode mix") are added. During the use of a primary cell, the electrochemical process inside the cell causes polarization (that is, the deposit of bubbles of hydrogen gas on the electrodes) with the result that the internal resistance of the cell is increased, with concomitant reduction in the flow of current, and reduction in useful life. In particular, hydrogen gas is evolved at the anode and this hydrogen gas must be removed if the cell is to function properly for practical periods. In the conventional Leclanche cell (carbon anode, zinc cathode), undesirable polarization is reduced by a mixture of manganese dioxide and graphite as depolarizers, which may be maintained, for example, in a container which encloses the carbon anode electrode. One limitation of the Leclanche cell is that its open-circuit voltage is 1.3 volts instead of a desirable typical voltage of 1.5 to 1.8 volts. A battery cell with an open-circuit voltage which is higher is desirable, since it can be used for many more applications and take up much less space, particularly where the cells are series-connected.

The conventional battery cells used today, e.g., "C" cells and "D" cells, are also severely limited in low-temperature applications. They do not function below approximately −4° F. In effect, at such low temperatures, the electrolyte tends to freeze and causes a barrier to the flow of current. This has many consequences which are undesirable.

An adequate battery capacity of a conventional "D" cell is approximately 10 ampere-hours. Up to now, the capacity of a conventional "D" cell using a magnesium anode has been approximately 7 ampere hours, even at low rates of current discharge. Prior to the improvements herein, battery cells using magnesium electrodes could not be discharged at heavy rates of discharge without the evolution of substantial hydrogen gas, polarization and accompanying short battery cell life. This has been true even for moderate rates of current discharge (approximately 200 milliamperes). With the evolution of hydrogen gas the moisture content of the electrolyte goes down, there is a drop-off in voltage, and as the electrolyte dries, cell performance drops dramatically.

OBJECT OF THE INVENTION

The object of the present invention is to provide a battery cell with improved life, i.e., improved battery capacity for longer operating periods of time. A further object of the invention is to provide a more reliable battery which is safe to use.

A further object of the invention is to provide a widely useable battery cell with a higher open circuit voltage to provide additional applications for such a battery cell at less cost and higher packing density. A further object of the invention is to provide a battery cell which has all the above characteristics and in addition may be operated satisfactorily not only at room temperature but at low temperatures, that is, well below the normal lower limit of temperatures for conventional battery cells.

A still further object of the invention is to provide a battery cell with a negligible start-up time where prior art battery cells are known to have start-up times of from 2 seconds to as much as 30 seconds before they become operational. The battery cells of the invention herein may be designed so that start-up time will not diminish significantly after long periods of use and under temperature conditions which would affect the operation of known or presently used battery cells.

SUMMARY OF THE INVENTION

According to the present invention, a battery cell is provided using heretofore known materials for the anode and cathode, but with special ingredients for the cathode mix and electrolyte used with the electrodes. A magnesium carbon cell is provided which produces an open-circuit voltage of at least 1.8 volts. By using special materials for the cathode mix and electrolyte liquid, extended life (to the usual limit of 0.9 volts output) is attained with higher ampere-hour capacity.

A conventional cathode mix and electrolyte typically contain manganese dioxide, carbon black (e.g. acetylene black), barium chromate, and magnesium hydroxide as the dry parts of the cathode mix, and magnesium perchlorate $Mg(ClO_4)_2$ and lithium chromate $Li_2CrO_4$ as the wet components of the electrolyte. The magnesium hydroxide of the mix coats the magnesium anode and lends some initial protection against the effect of hydrogen gas evolving from the anode.

In accordance with the invention set forth herein, the life and capacity of the cell are improved by the addition of special ingredients to the cathode mix. One additive is one or more oxides of metals of the noble metal group (such as silver, gold, platinum, palladium), of the alkaline earth group (such as strontium, barium, cesium or others), of the rare earth group (such as thorium, plutonium) or of the conductive group (such as nickel, copper, tin (stannous) lead, cobalt, aluminum or others). These oxides will work to prevent the deterioration of current flow by the evolution of hydrogen gas, as these oxides will absorb hydrogen that is liberated at the magnesium electrode. Potassium mono-peroxy-sulfate (OXONE ® sold by Dupont) may be added to the electrolyte to give a higher open-circuit voltage, with or without the above-mentioned metal oxide additives to the cathode mix. However, in the presence of the above metal oxides there is a marked increase in battery capacity with use of the OXONE additive. In addition, lithium chloride may be added to the cathode mix to cause the battery cell to give better performance and particularly better battery capacity at very low temperature operation, heretofore unattainable with conventional "C" and "D" cells.

Conventional magnesium-manganese dioxide cells often exhibit a substantial delay in providing voltage after a load is connected. The present invention reduces such delay substantially, to a negligible amount and to a few seconds even after shelf storage of several years.

In order that the manner in which the foregoing and other objects of the invention are attained in accordance with the invention can be understood more in detail, embodiments thereof will be described with reference to the accompanying drawings, which form a part of the specification and wherein:

FIG. 1 is a longitudinal cross-sectional view of a conventional inside/outside battery cell, constructed in accordance with R. R. Balaguer U.S. Pat. No. 3,490,952, issued Jan. 20, 1970;

DESCRIPTION OF THE PREFERRED EMBODIMENTS

Figure 1:
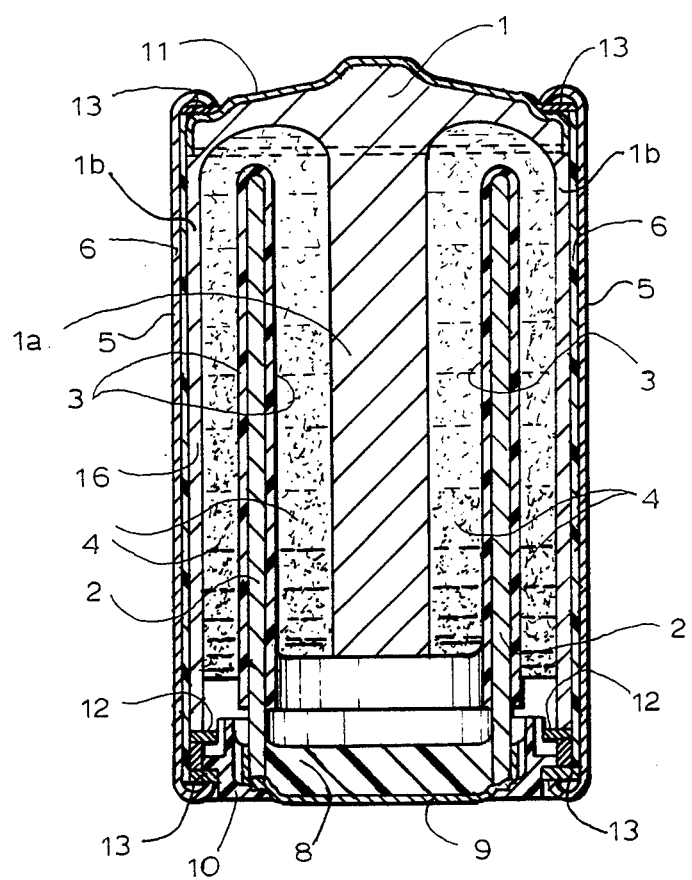
Figure 2:
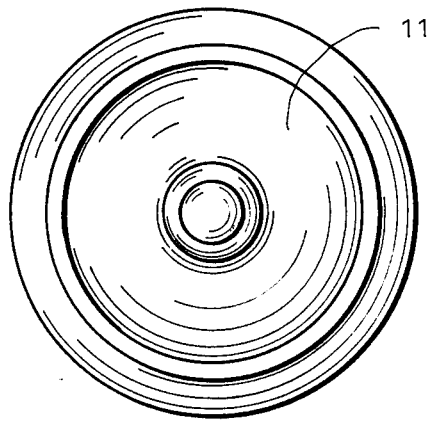
FIG. 2 is a top view of the cell of FIG. 1.

The present invention may be used with substantially any type of battery construction, including that of the conventional C and D cells, or button cells or the "inside-outside" construction, and others, such as those shown in M. E. Wilke and H. J. Strauss, U.S. Pat. No. 3,615,866, issued Oct. 26, 1971; M. E. Wilke, U.S. Pat. No. 3,427,202, issued Feb. 11, 1969; P. F. George, U.S. Pat. No. 3,490,951, issued Jan. 20, 1970; L. W. Eaton, U.S. Pat. No. 3,634,142, issued Jan. 11, 1972; and S. Ruben, U.S. Pat. No. 3,539,398, issued Nov. 10, 1970. For convenience, the invention is described with respect to the inside-outside construction which provides known advantages.

The conventional inside-outside construction of battery cell uses a cylindrical carbon cup 1 which is desirably formed by molding and constitutes the current collector of the cell. This current collector may also be made of stainless steel. The cup 1 has a central rod 1a usually molded integrally with the outer wall 1b of cup 1. Concentric with the cathode cup 1 is an anode 2 formed as a sleeve or tube concentric with the cup wall 1b and rod 1a, and desirably about equally spaced between them. The anode 2 can be illustratively formed of magnesium alloy metal. A separator material (preferably unbleached kraft paper 3) is placed on either side of the anode 2 to prevent short-circuiting in the battery cell. The cathode mix and electrolyte 4 is poured and tamped into the carbon cup when it is in reversed (upside-down) position. In this reversed position, the anode 2 is inserted and the cup is packed with the cathode mix and electrolyte. In such a construction both the inside wall and the outside wall of the anode participate in the cell reaction. The battery cell has a metal jacket or shell 5 which is spaced or insulated from the electrodes and thus does not enter into any of the reactions. A plastic material 6 may be placed between the metal shell or can and the active portion of the cell. The bottom of the anode 2 is connected to a metal contact plate or ring 9 which may illustratively be of annealed nickel plated steel. An epoxy layer 8 may also be used to make good metal-to-metal contact between the anode 2 and the metal contact element 9. Plastic anode ring 10 closes the metal jacket 5 to the outer cup wall 1b. A sealing washer is indicated at 12 and a vent washer at 13. A closure plate and contact 11 is placed on the carbon cup 1 and is scaled to shell 5.

Figure 3:
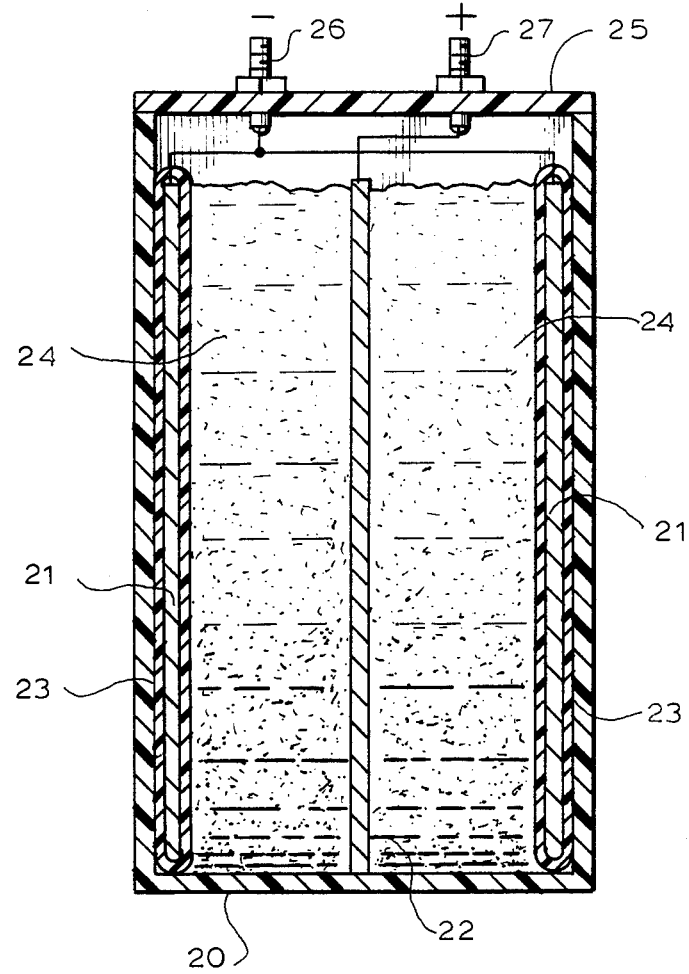
FIG. 3 is a similar view of a conventional prismatic battery cell construction.
Figure 4:
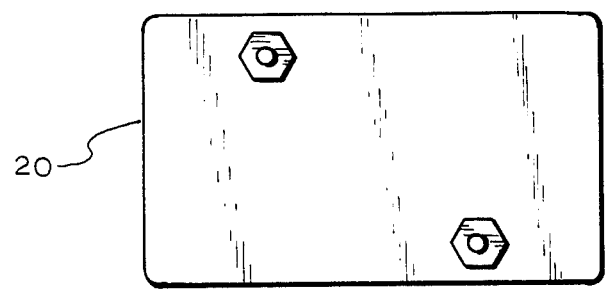
FIG. 4 is a top view of the cell of FIG. 3.
Figure 5:
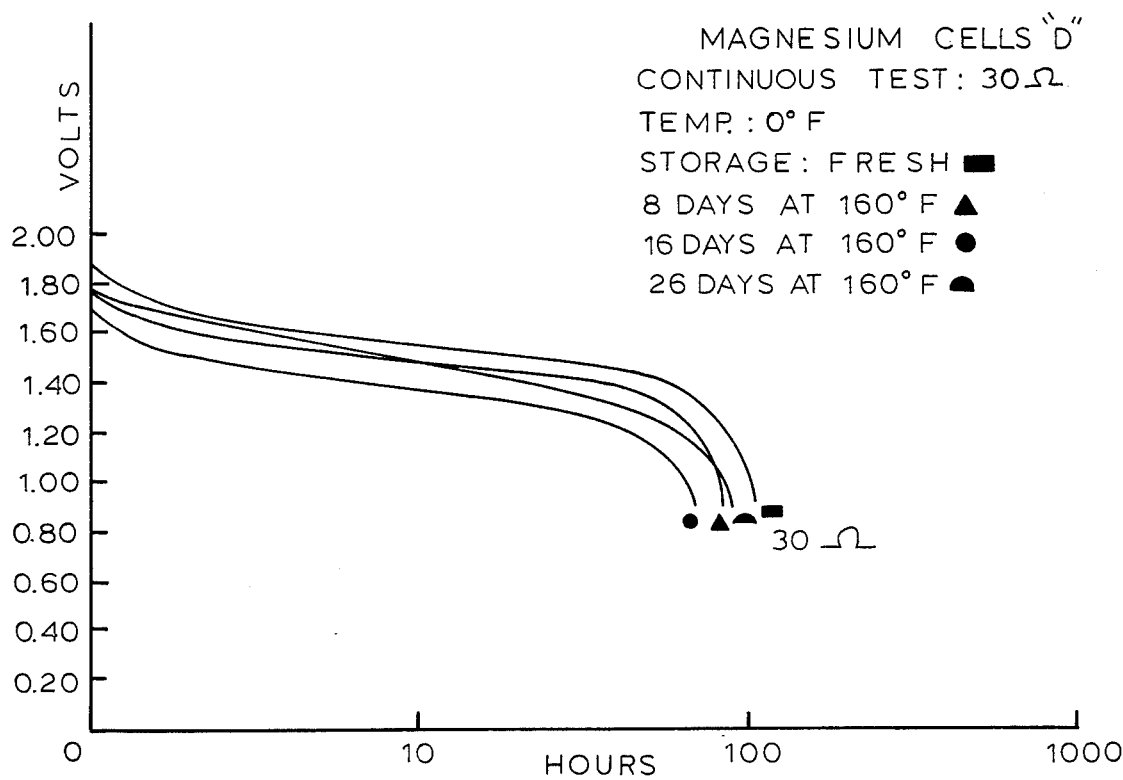
FIGS. 5–10 are graphs illustrating the variation of battery voltage with time under constant load, at room temperature and at lower temperatures, using the inside/outside construction of FIG. 1 above.
Figure 6:
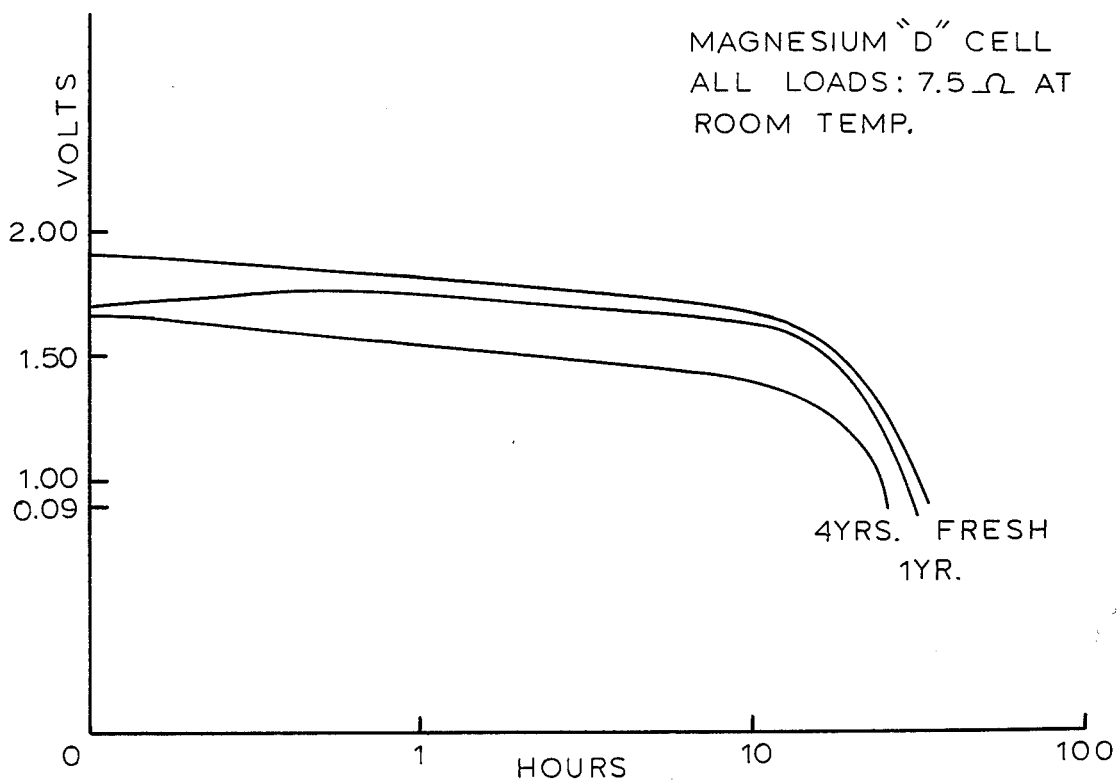
Figure 7:
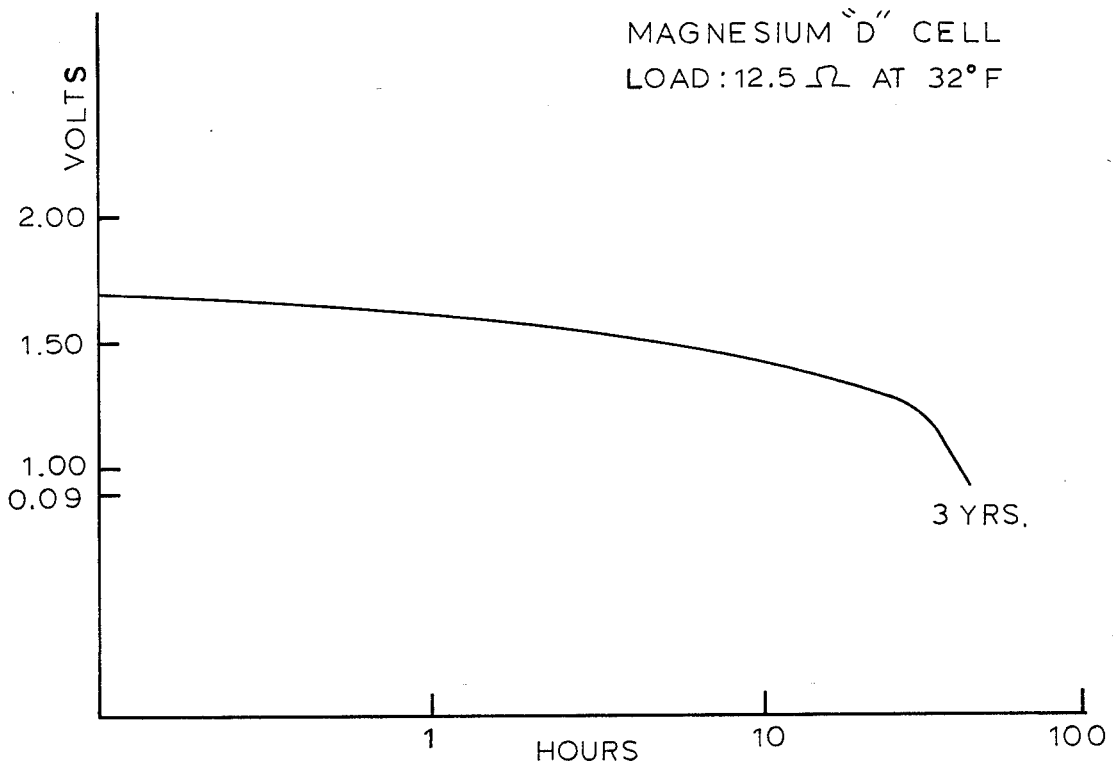
Figure 8:
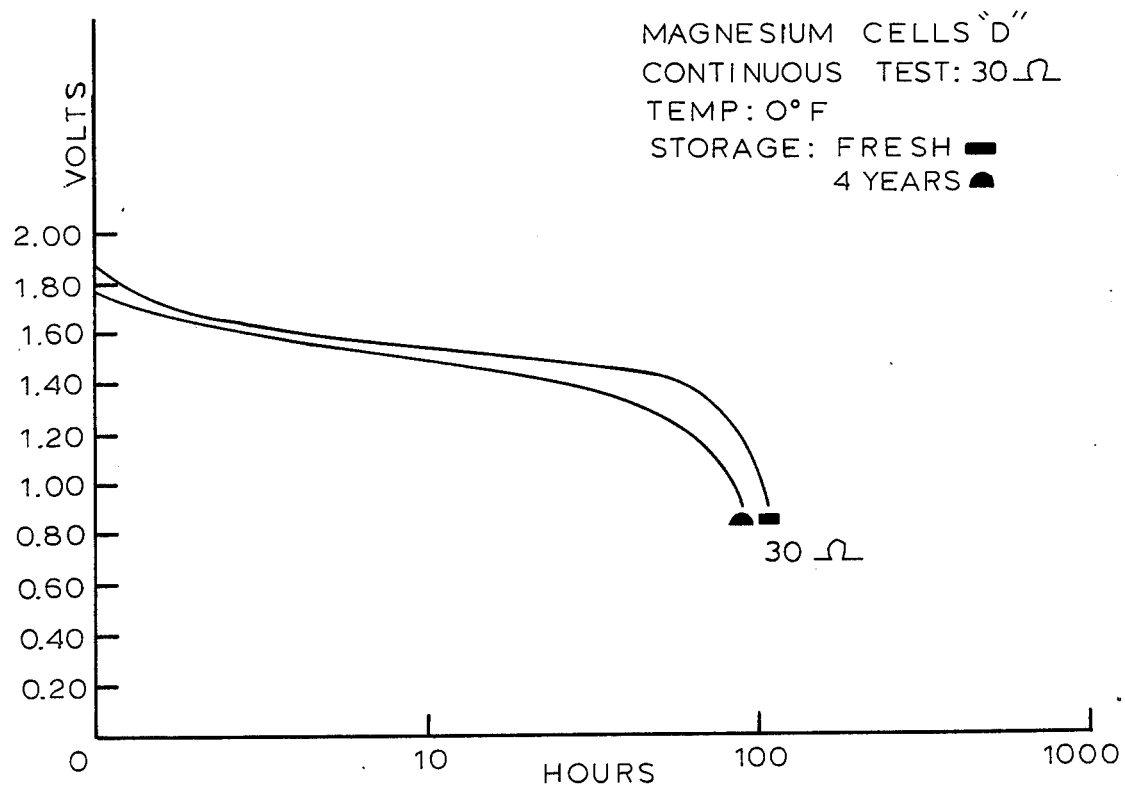
Figure 9:
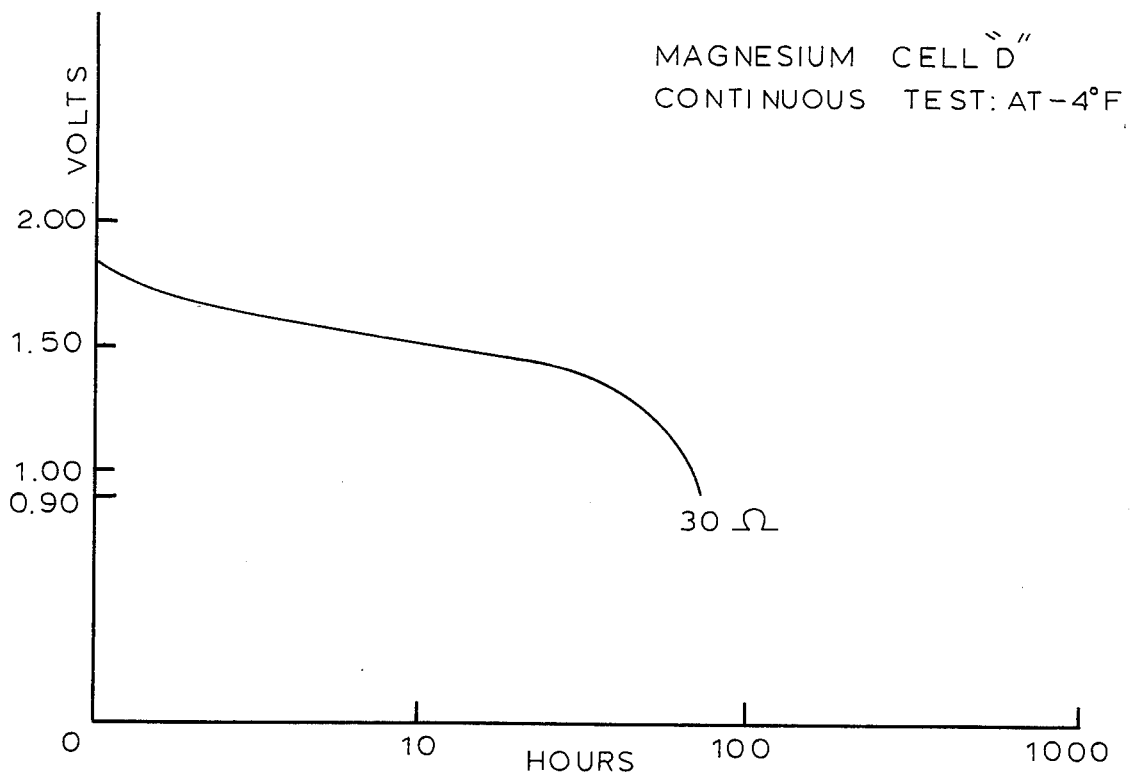
Figure 10:
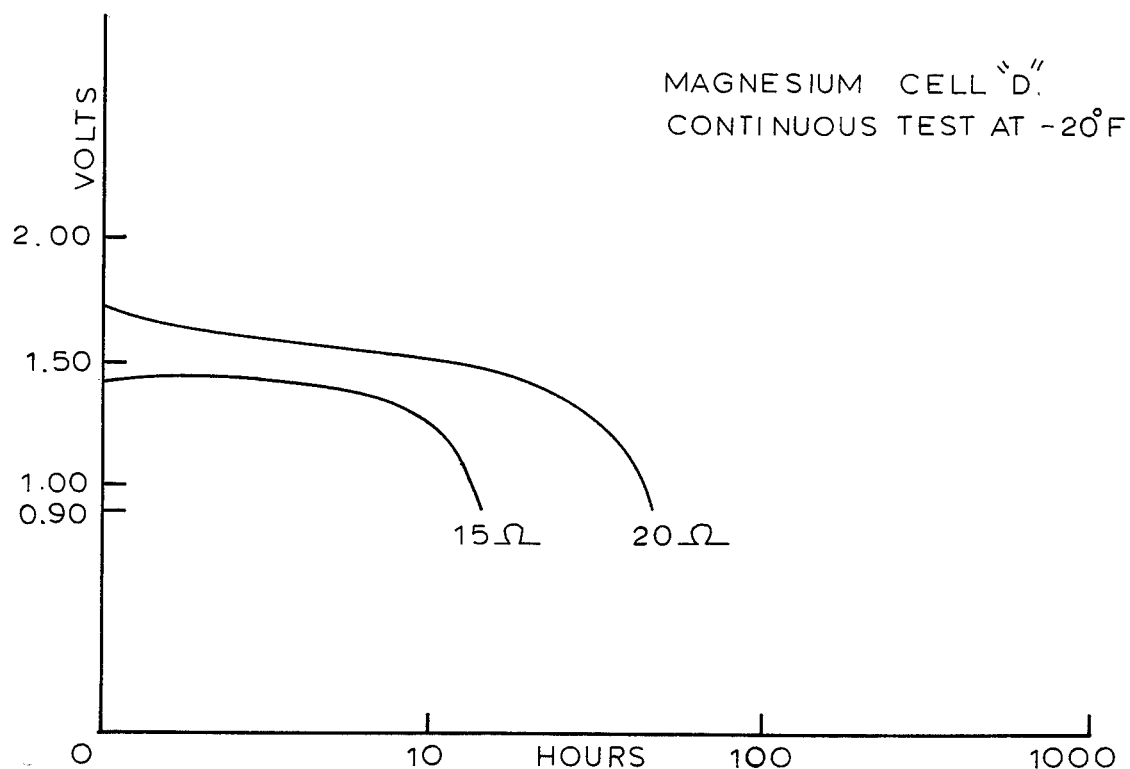

FIG. 3 shows, in longitudinal cross-section, a prismatic cell within a battery case 20 which may be insulating. The construction includes a pair of magnesium anode plates 21 and a carbon current collector plate 22, separators 23 and the electrolyte and cathode mix 24. The insulating battery cap 25 is connected to the battery case. Terminals 26, 27 are connected respectively to the magnesium plates 21 and carbon plate 22. A top view (FIG. 4) has also been included.

The electrolyte and cathode mix 4 of the invention preferably has a 50% to 60% wetness (i.e., proportion of liquid to dry mix) to retain proper wetness for satisfactory operation. If the electrolyte and mix does not remain moist, the flow of current will drop in a short period of time and ultimately cease. There may also be a loss of moisture from venting of the cell by reason of hydrogen evolution and, ultimately, in extreme cases, leakage of the electrolyte. The conventional manganese dioxide type of cathode mix includes a cathode dry mix and a liquid electrolyte. A conventional cathode dry mix which has been used with a magnesium anode for an inside-outside construction of battery cell contains manganese dioxide, carbon black (e.g. acetylene black), barium chromate and magnesium hydroxide. One typical formulation has the following proportions:

| Material | Proportion |
| --- | --- |
| Manganese dioxide | 86 parts by weight |
| Carbon black | 10 parts by weight |
| Barium Chromate | 3 parts by weight |
| Magnesium Hydroxide | 1 part by weight |

The acetylene black has had a porosity permitting pressing to one-half its volume, sometimes called 50% compression.

One typical formulation of the wet portion or electrolyte to be added to the foregoing dry mix for a conventional magnesium-manganese dioxide cell is: 4.1 normal solution of magnesium perchlorate, $Mg(ClO_4)_2$, in water, plus about 0.20 gram of lithium chromate, $Li_2CrO_4$, per liter, producing a specific gravity of about 1.31. The wetness of this typical composition of dry mix plus electrolyte is 50–55 cc. of electrolyte per 100 grams of dry mix, to produce a "wet mix" formed of the dry mix plus electrolyte liquid.

An improved battery cell of the present invention includes in addition to the above, a small amount of one or more metal oxides described above, in the range of up to about 10%. One or a combination of these oxides acts to absorb hydrogen which is liberated from the magnesium anode surface in the magnesium-manganese dioxide cell. The presence of one or more of these additives to the conventional mix as set forth above improves battery performance substantially. As seen from the examples set forth below, the use of these metal oxides can improve battery capacity by as much as approximately 30% at room temperature and 10% at low temperature (−4° F.) application.

According to another feature of the invention potassium monoperoxysulfate, $2KHSO_5$ (e.g., OXONE ®) is added in small amounts (with or without the oxide additive) in the range of 0.1 to 10% by weight (and preferably 0.1 to 0.5%) to increase the open-circuit voltage of the battery cell. The enhancement from the use of this sulfate is shown in that the opencircuit voltage can improve from 1.8 volts to 2.3 volts, a significant and substantial increase in that characteristic.

It is believed that the use of OXONE ® enhances the evolution of oxygen. This oxygen recombines with hydrogen which is being liberated from the magnesium anode, to form water, thus maintaining the moistness of the electrolyte and allowing for a larger battery capacity and providing longer battery lifetime with continuous current flow.

According to still another feature of the invention, lithium chloride is added to the cathode mix in small amounts to allow the cell to operate at low temperatures to approximately −68° F., without noticeable adverse effects. The quantity of lithium chloride (or other chloride) used should be enough to give desired low-temperature characteristics, but not so much as to cause self-discharge. A amount of lithium chloride in the range of 0.01 to 10% is suitable with 0.01 to 3.0% being preferred.

The addition of lithium chloride to a conventional manganese dioxide type cathode mix and electrolyte, even without the above-mentioned OXONE ® or oxide additions to the dry mix, will, by itself, improve battery performance by as much as 12% over a conventional manganese dioxide dry mix and electrolyte. The addition of lithium chloride does not affect the room-temperature operation of the battery cell described herein, while significantly improving low-temperature reaction. The battery cell described above, with both the metal oxide and lithium chloride additives may have an improved battery capacity of 15-20% over a conventional magnesium-manganese dioxide cell.

The addition of lithium chloride to a battery cell which already contains one or more of the metal oxides of this invention plus added potassium monoperoxysulfate does not affect its normal or room-temperature performance, but the addition of lithium chloride will avoid reduction of battery capacity at much lower operating temperatures.

In a preferred embodiment of the invention, a battery cell uses the above-mentioned "inside-outside" construction with a magnesium metal anode, a carbon composite current collector, a cathode dry mix containing manganese dioxide type "M" (70-90 parts by weight); carbon black, preferably acetylene black of 50% compressability (5-20 parts by weight); barium chromate (1-6 parts by weight); magnesium hydroxide (1-6 parts by weight). Two- to seven-normal magnesium perchlorate is added, as part of the electrolyte to the extent of 40 to 60% of the dry mix to form a wet mix; and nickel oxide (black) is added to the extent of 0.5-10% of the wet mix by weight. To this wet mix, there may be added (in an amount approximately 7.5% to 10% by weight of the wet mix) a deionized water solution containing approximately 2-5% potassium monoperoxysulfate (OXONE ®) and approximately 0.01-3% of lithium chloride. This battery cell composite will improve battery capacity by as much as 30-40% over well-known battery cells using a magnesium metal anode, a carbon current collector and a standard manganese dioxide cathode dry mix and electrolyte.

Specific examples according to the invention are given in the following:

EXAMPLE 1

Magnesium metal anode-manganese dioxide cathode "D" cells were made using the inside-outside construction with a cathode mix having the following constituents:

| A. Basic Dry Mix: | |
| --- | --- |
| Manganese dioxide, Type M | 86 parts by weight |
| Acetylene black (50% Compression) | 10 parts by weight |
| Barium Chromate | 3 parts by weight |
| Magnesium Hydroxide | 1 parts by weight |
| B. Electrolyte | |
| Magnesium perchlorate, 4.1 Normal solution | 50-55 cc. per 100 gm. of dry mix (to form a "wet mix") |
| C. Additive | |
| Nickel Oxide (black) | 1% of wet mix |
| Copper Oxide (black) | 4% of wet mix |

When cells were discharged through a 7.5 ohm resistance continuously at room temperature, the cells showed no signs of leakage or distortion during the discharge cycle. The cells yielded a battery capacity of 8.8 ampere-hours at the standard cut-off of 0.90 volts, with a starting voltage of 1.8 volts.

Other such cells were conditioned for 12 hours at 0° F. and discharged through 30 ohms at that low temperature. Cells then yielded 6.4 ampere-hours to a cut-off of 0.90 volts.

EXAMPLE 2

"D" cells were constructed as in Example 1 but 5% copper oxide (black) was used in place of the combination of nickel and copper oxide. A continuous discharge of 7.5 ohms at room temperature yielded a battery capacity of 9.0 ampere-hours to a cut-off of 0.9 volts. After conditioning a similar "D" cell for 12 hours at 0° F., the cell was discharged through a 30-ohm resistance at 0° F. and yielded a 6.8 ampere-hour capacity to a cut-off of 0.90 volts.

EXAMPLE 3

"D" cells were constructed as in Example 2, but with the addition of potassium monoperoxysulfate to the extent of 2.5% of the wet mix. A cell subjected to a continuous discharge through 7.5 ohms at room temperature yielded a battery capacity of 9.5 ampere-hours to a cut-off of 0.90 volts.

EXAMPLE 4

"D" cells were prepared with the mix as in Example 1, but with added solution of potassium monoperoxysulfate of 2.5% concentration and lithium chloride of 0.5% concentration in deionized water, in an amount of 5% of the mix. A cell subjected to a continuous discharge of 7.5 ohms at room temperature, yielded a battery capacity of 10.8 ampere-hours to a cut-off of 0.90 volts.

A "D" cell of this Example 4 was subjected to accelerated aging. During the aging period, the cell showed no sign of deterioration by way of self discharge. Upon discharge after accelerated aging to an equivalent of 10 years of storage, the cells yielded 90% of their rated capacity. Unlike some of the well-known lithium cells, the voltage delay (i.e., in attainment of full voltage) after accelerated aging was just a few seconds.

Figure 11:
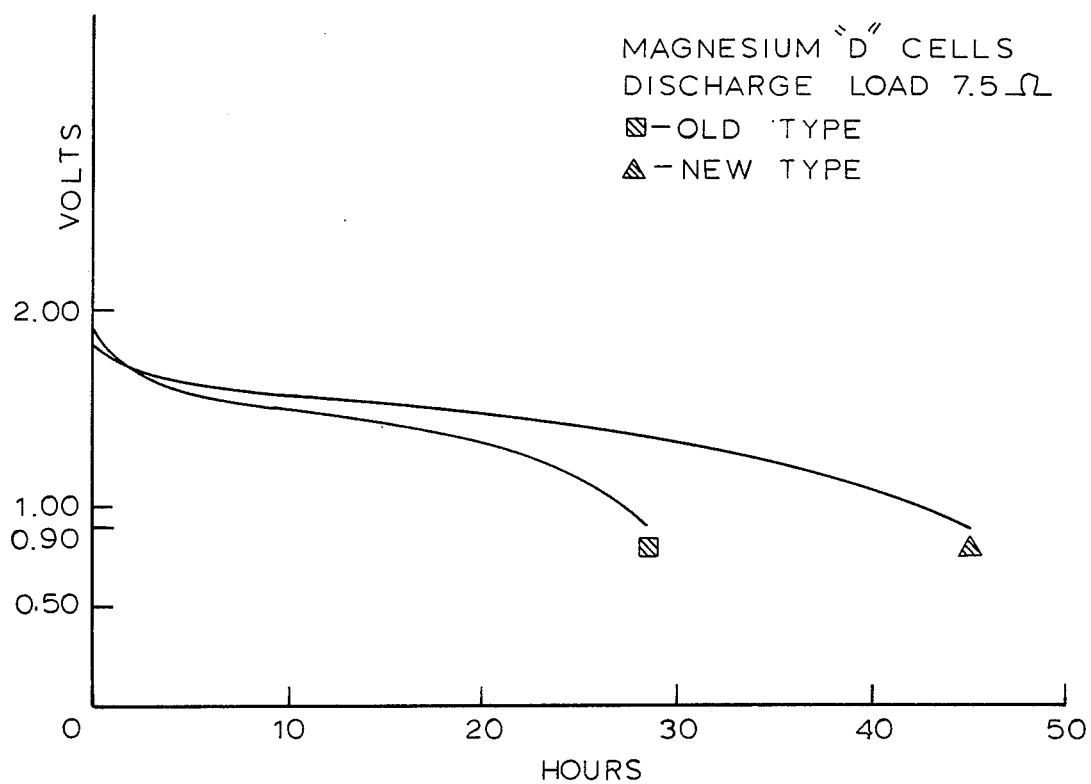
FIG. 11 is a graph comparing standard prior art battery "D" cell performance ("old type") with the performance of a battery "D" cell having a composition as described by this specification ("new type").

FIGS. 5–10 show by graphs the results of accelerated aging and storage at temperature of 160° F., room temperature, 32° F., 0° F., −4° F. and −20° F., respectively on the battery cells prepared in accordance with Example 4 hereof. FIG. 11 compares the battery cell of Example 4, designated "New Type", to a battery cell ("Old Type") with the composition of Example 4 except without the presence of (1) copper oxide, (2) nickel oxide and (3) the deionized water solution containing OXONE ® and lithium chloride. The graph shows an increase of over 50% in hours operational until cut-off for the "New Type" or battery cell prepared in accordance with Example 4.

The anode efficiency of the anode of the "New Type" cell, i.e., the control of deterioration in weight of the anode during operation and until cut-off voltage, is very high, i.e., approximately 98%. The anode efficiency for the "Old Type" was approximately 63%.

EXAMPLE 5

Cells were made with a mix formed of 200 grams of the conventional wet mix described above, to which was added 10 grams nickel oxide ($NiO_2$), and 10 cc of a 0.25% solution of lithium chloride. These cells showed an open circuit voltage of about 1.95 volts, and lasted about 27 hours when discharging through 7.5 ohms or 55 hours when discharging through 15 ohms.

EXAMPLE 6

With 10 grams $CuO_2$ substituted for the nickel oxide in the mix of Example 5, the open circuit voltages were about the same. At 7.5 ohms, discharge lasted about 36 hours, and at 15 ohms about 78 hours. At 0° F., discharge through 30 ohms lasted 108 hours.

EXAMPLE 7

Cells were made with the conventional wet mix described above, to which was added 3% copper oxide by weight, 2% nickel oxide by weight, and 5% by weight of a solution having 3% potassium monoperoxysulfate and 2% lithium chloride in deionized water.

Open circuit voltages were about 2.0 volts. Discharge time when fresh, through 7.5 ohms, was over 30 hours, and through 30 ohms (at 0° F.) was over 80 hours.

After accelerated aging for 8, 16, 24, 32, 46 and 50 days at 160° F., these results were not substantially changed.

EXAMPLE 8

Cells were made as in Example 7, but with copper oxide ($CuO_2$) substituted for the nickel oxide ($NiO_2$). Similar results were obtained.

The addition of potassium monoperoxysulfate is extremely effective in raising the open-circuit voltage of the battery cell and, of equal importance, it enhances evolution of oxygen which recombines with hydrogen gas, which is continuously evolved at the anode, to form water and to keep moistness in the mix and electrolyte for a much longer period of time. Thus, undesirable polarization is avoided and the battery cell is able to function properly for a longer period of time.

The battery cells of the invention thus have good shelf life, high open-circuit voltage, and improved capacity, especially at lower temperatures.

The above improvements to battery cells may be used not only for battery cells of the inside-outside construction described, but also in other constructions, such as prismatic constructed battery cells, bipolar packs for transistorized batteries, button cells in single or multiple stacks, and in various sizes, such as "C", "D", "Fat D", No. 6, or others.

The above description has been essentially that of battery cells which may be considered primary cells since the electrodes are ultimately consumed. It is possible to also use the elements described above for secondary cells, i.e., for battery cells which can be restored to their original state by charging (passing an electric current through the cells so that the electrodes are regenerated). These cells include accumulator or storage batteries.

While varying embodiments of the invention have been shown and described, the invention is not limited thereto but may be otherwise variously embodied and practiced within the scope of the following claims.

What is claimed is:

1. A battery cell containing an anode, a current collector, and a combined cathode dry mix and aqueous electrolyte primarily composed of manganese dioxide, in which said dry mix includes one or more oxides of a metal selected from the group consisting of the noble metals, the rare earth metals, the alkaline earth metals, and conductive metals; and further includes a small amount of potassium monoperoxysulfate.

2. The battery cell of claim 1, wherein said cathode mix includes a substantially small amount of lithium chloride.

3. The battery cell of claim 1 in which said cathode dry mix and electrolyte includes small amounts of potassium monoperoxysulfate and lithium chloride.

4. The battery cell containing an anode, a combined cathode and a cathode dry mix and aqueous electrolyte primarily composed of manganese dioxide and including a substantially small amount of potassium monoperoxysulfate.

5. The battery cell as in claim 4 wherein said cathode mix also includes a small amount of lithium chloride.

6. A battery cell having a magnesium metal anode, a carbon current collector, and a combined manganese-dioxide-type cathode dry mix and electrolyte containing a small amount of potassium monoperoxysulfate.

7. The battery cell of claim 6 in which said cathode dry mix and electrolyte also includes a substantially small amount of lithium chloride.

8. The battery cell of claim 6 also containing a small amount of one or more metal oxides taken from the group comprising nickel oxide, copper oxide, lead dioxide, cobalt oxide, aluminum oxide, stannous oxide, and silver oxide.

9. A battery cell comprising a magnesium metal anode, a carbon current collector, and a combined cathode dry mix and electrolyte including potassium monoperoxysulfate containing substantially the following:
   (a) Manganese dioxide in the range of 70–90% by weight;
   (b) Carbon black in the range of 5 to 20%;
   (c) Barium chromate in the range of 1 to 6%;
   (d) Magnesium hydroxide in the range of 1 to 6%;
   (e) Magnesium perchlorate - 2N to 7N and
   (f) Metal oxide in the range of 0.5 to 10% by weight of one or more of the following group of metal oxides: nickel oxide, copper oxide, stannous oxide, lead dioxide, cobalt oxide, aluminum oxide and silver oxide.

10. the battery cell of claim 9 where said cathode dry mix and electrolyte includes a small amount of lithium chloride.

11. A battery cell comprising a magnesium metal anode, a carbon current collector, and a manganese dioxide cathode dry mix and electrolyte containing substantially the following:

(a) Manganese dioxide Type "M" in the range of 70-90% by weight;
(b) Acetylene black (50% compression) in the range of 5 to 20%;
(c) Barium chromate in the range of 1 to 6%;
(d) Magnesium hydroxide in the range of 1 to 6%;
(e) Magnesium perchlorate - 2N to 7N, and
(f) A small amount of potassium monoperoxysulfate.

12. A battery cell comprising a magnesium metal anode, a carbon current collector, a manganese-dioxide-type cathode dry mix and electrolyte with the addition to said cathode dry mix and electrolyte of potassium monoperoxysulfate in a solution which is 5-20% by weight of the total cathode dry mix and electrolyte and which solution contains 2-5% by weight of potassium monoperoxysulfate.

13. A battery cell as in claim 12 also including one or more metal oxides in the cathode dry mix and electrolyte, said oxides being taken from the group containing nickel oxide (black) and copper oxide (black) in an amount of 0.5-10% by weight.

14. A battery cell as in claim 13 with the further addition of 0.01-3% of lithium chloride to said electrolyte.

15. The battery cell of claim 10 wherein the ingredients are present in substantially the following proportions:

| | | |
|---|---|---|
| Manganese dioxide | 86 | parts |
| Acetylene black | 10 | " |
| Barium chromate | 3 | " |
| Magnesium hydroxide | 1 | " |
| Copper oxide | 4% | of the foregoing |
| Nickel oxide | 1% | " | and said electrolyte comprises a first solution in water of magnesium perchlorate (substantially 4.1 normal) and about 0.2 gm. lithium chromate per liter, to provide a solution of specific gravity substantially equal to 1.31, to which has been added a second solution in water of about 2.5% potassium monoperoxysulfate plus 0.5% lithium chloride in an amount about 5% of the dry mix plus first solution.

16. The process of preparing a battery cell which comprises the steps of:
  (a) providing a magnesium metal anode and a carbon current collector;
  (b) providing a manganese-dioxide-type cathode dry mix and electrolyte;
  (c) including in said cathode dry mix 0.5-10% of one or more metal oxides from the group containing nickel oxide, copper oxide, lead dioxide, cobalt dioxide, aluminum oxide and silver oxide; and further comprises the steps of including a solution of potassium monoperoxysulfate in the cathode dry mix and electrolyte.

17. The process of claim 16 further including the steps of including in said solution lithium chloride in the range of 0.01%-3% by weight of said solution.

18. The process of preparing a battery cell which comprises the steps of:
  (a) providing a magnesium metal anode and a carbon or stainless steel current collector;
  (b) providing a manganese-dioxide-type cathode dry mix and electrolyte;
  (c) including a solution of potassium monoperoxysulfate in the cathode dry mix and electrolyte, wherein said solution is 5-20% by weight of the total cathode dry mix and electrolyte and wherein said potassium monoperoxysulfate is in the range of 2-5% by weight of said solution.

* * * * *